United States Patent
Tranquilla

(10) Patent No.: US 6,430,520 B1
(45) Date of Patent: Aug. 6, 2002

(54) DYNAMIC FRICTION MEASUREMENT APPARATUS AND METHOD

(75) Inventor: Michael N. Tranquilla, Livonia, MI (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/459,557

(22) Filed: Dec. 13, 1999

(51) Int. Cl.⁷ .............................................. G01B 15/00
(52) U.S. Cl. ................... 702/141; 73/9; 702/41
(58) Field of Search .................... 73/7, 9, 10; 702/9, 702/41, 141, 175, 86, 95

(56) References Cited

U.S. PATENT DOCUMENTS

| | | | |
|---|---|---|---|
| 4,003,241 A | 1/1977 | Thomas .......................... 73/9 |
| 4,004,450 A | 1/1977 | Yakshin et al. ............. 73/12.01 |
| 4,030,339 A | 6/1977 | Yakshin et al. ............. 73/12.01 |
| 4,067,231 A | 1/1978 | Yakshin et al. ................ 73/658 |
| 4,387,587 A | 6/1983 | Faulconer ......................... 73/9 |
| 4,813,266 A | 3/1989 | Nash ................................ 73/9 |
| 5,107,448 A | * 4/1992 | Nash ........................... 702/141 |
| 5,144,847 A | 9/1992 | Furtmayer ............. 73/862.625 |
| 5,490,410 A | 2/1996 | Markström ....................... 73/9 |
| 5,579,246 A | 11/1996 | Ebersbach et al. ............ 702/95 |
| 5,736,630 A | * 4/1998 | Welner .............................. 73/9 |
| 5,750,879 A | 5/1998 | Ohtsuka et al. .................. 73/9 |
| 5,771,177 A | 6/1998 | Tada et al. .................... 702/41 |
| 5,903,855 A | 5/1999 | Kiyota ......................... 702/86 |
| 6,199,424 B1 | * 3/2001 | Mani et al. ....................... 73/9 |

* cited by examiner

*Primary Examiner*—John S. Hilten
*Assistant Examiner*—John Le
(74) *Attorney, Agent, or Firm*—Harness, Dickey & Pierce PLC; Lise A. Rode; Mark T. Starr

(57) ABSTRACT

A dynamic friction measurement apparatus includes a load cell, accelerometer, and a computational device for determining the coefficient of friction corrected for inertial forces which otherwise cause an error in the calculation. The calculation device has the functions of simultaneously receiving the signals, conditioning the signals, creating output in digital or analog electrical signals, and storing or providing a value for the coefficient of friction from the dynamic measurements. A method for detecting and processing the coefficient of friction during dynamic condition is also provided.

12 Claims, 3 Drawing Sheets

DYNAMIC FRICTION MEASUREMENT APPARATUS AND METHOD

BACKGROUND OF THE INVENTION

1. Technical Field

The invention is related to dynamic friction measurement and, more particularly, to an apparatus and a method for measuring the dynamic coefficient of friction between two objects with relatively sliding surfaces.

2. Discussion of Related Art

The coefficient of friction is the ratio of the friction force to the normal force. Previous devices and methods determine the frictional force by an average of measurements, such as the mean of peak-to-peak values, over a period of time. Further, prior devices and methods typically use a weight to provide the normal force. The weight, however, has mass, and thus inertia. During dynamic sliding of two objects for these prior devices and methods, inertial forces develop from accelerations of the mass. As a result, the measured frictional force is in error by the amount of the inertial force, which is equal to the mass multiplied by acceleration of the mass.

SUMMARY OF THE INVENTION

In accordance with the teachings of the present invention, a device and a method that measures the dynamic coefficient of friction and correctly adjusts the calculation for errors caused by the inertial force is disclosed. A first object having a sliding surface movably touches a second object. An accelerometer and load cell is adjustably mounted to the first object with its longitudinal axis of sensitivity aligned parallel to a direction of motion of said first object. A computational device determines a frictional force correct for inertial forces from measured electrical signals produced by said load cell and said accelerometer.

BRIEF DESCRIPTION OF THE DRAWINGS

The accompanying drawings that are incorporated in and constitute part of the specification illustrate embodiments of the present invention and together with the description serve to explain the principles of the invention.

DETAILED DESCRIPTION OF THE PREFERRED EMBODIMENTS

Figure 1:
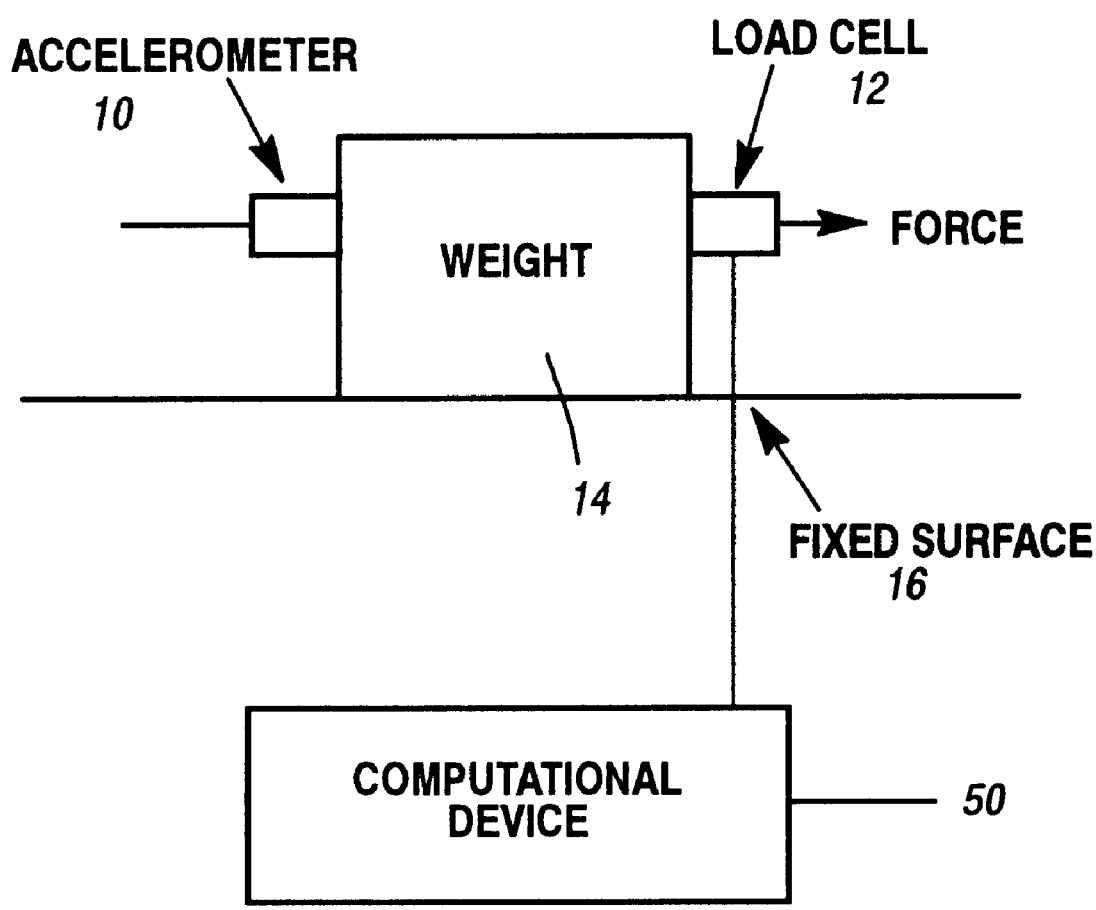
FIG. 1 is a perspective view of the friction measurement apparatus.

FIG. 1 shows a coefficient of friction measurement apparatus 13 according to the present invention. The apparatus 13 includes accelerometer 10 and load cell 12 connected to a first object that in the preferred embodiment is weight 14. Accelerometer 10 produces an electrical signal proportional to the acceleration of weight 14. Weight 14 preferably moves relative to a second object that in the preferred embodiment is surface 16. Accelerometer 10 measures the acceleration of weight 14, and load cell 12 measures the force applied to weight 14, whereby accelerometer 10 and load cell 12 can simultaneously measure acceleration and force, respectively. Signals from accelerometer 10 and load cell 12 are sent to computational device 50.

The electrical signals representing acceleration and force provide values for computing a friction force electrical signal $F_f$, the frictional force without measurement error produced by the inertial force. $F_f$ is calculated according to the equation:

$$F_f = F_{lc} - \frac{W}{g}a$$

where $F_{lc}$, represents the measured force, a represents the acceleration,

W represents the weight of said first object, and g represents gravitational acceleration.

Figure 2:
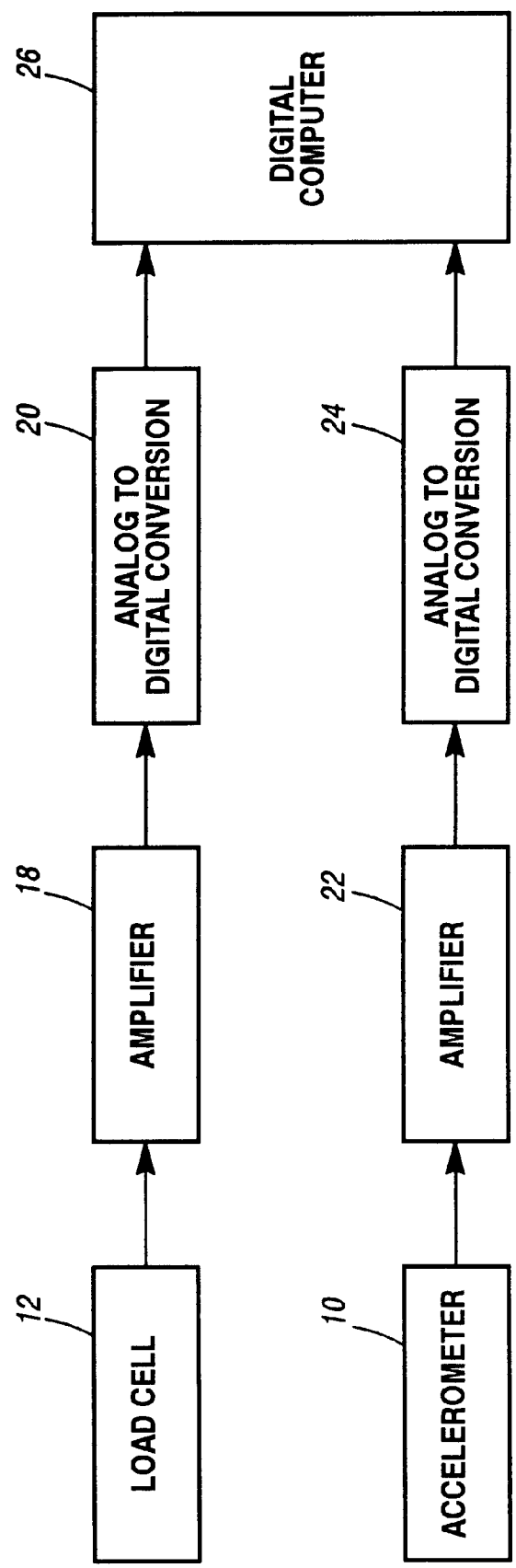
FIG. 2 is a block diagram showing the system components to determine a digital signal representation of the coefficient of friction of the present invention.

FIG. 2 is a block diagram representing frictional measurement apparatus 13 and a method for determining a dynamic coefficient of friction according to the invention. Acceleration of weight 14 is measured by accelerometer 10 which is connected to an amplifier 22, whereby an electrical signal is transmitted from accelerometer 10 to amplifier 22. While an amplifier is shown, according to the method a filter may be used in conjunction with or in replacement of the amplifier. Amplifier 22 strengthens the electric signal then transmits the signal to an A/D converter 24, which converts the strengthened electrical signal from an analog to digital signal. If a filter is used, the electrical signal is conditioned to produce a more reliable output to A/D converter 24. A/D converter 24 is connected to a digital computer 26, whereby the digital signal is transmitted to digital computer 26, wherein calculations using the acceleration signal can be performed.

With continued reference to the block diagram of FIG. 2, load cell 12 is connected to an amplifier 18, whereby an electrical signal representing a force measurement is transmitted from load cell 12 to amplifier 18. Again, a filter may be used in conjunction with or replacement of amplifier 18. Amplifier 18 transmits to A/D converter 20, which converts the electrical signal from an analog to a digital signal. A/D converter 20 transmits a strengthened signal to digital computer 26, which uses the load cell signal to perform calculations.

Figure 3:
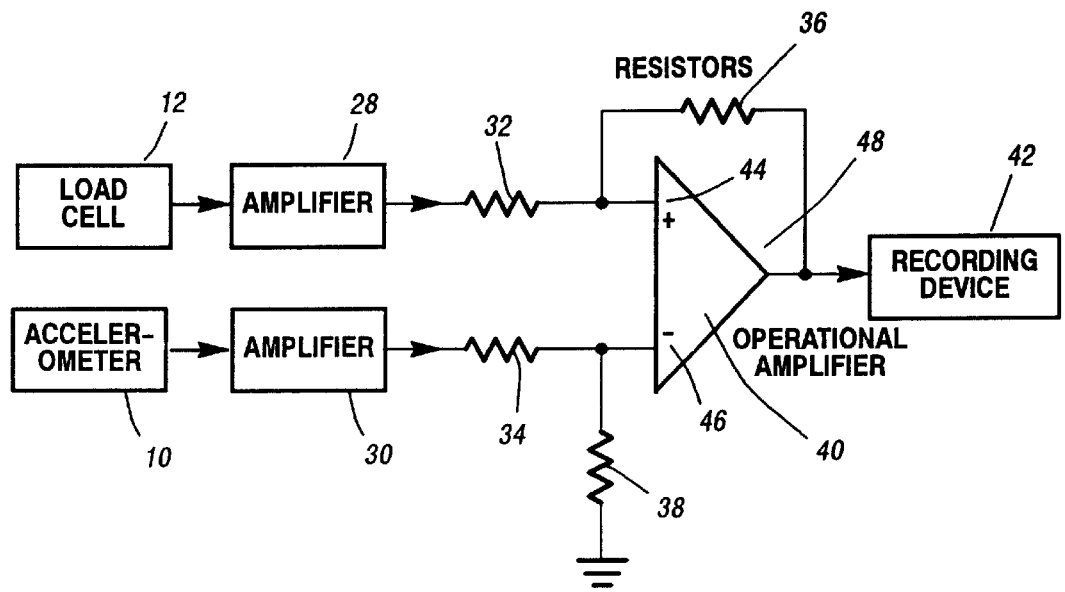
FIG. 3 is a circuit diagram showing the system components to determine the analog signal representation of the coefficient of friction of the present invention.

FIG. 3 is a block diagram representing frictional measurement apparatus and another method for determining the dynamic coefficient of friction according to the invention. Accelerometer 10 is connected to an amplifier 30, whereby an electrical signal representing acceleration of weight 14 is transmitted from accelerometer 10 to amplifier 30. Once again, a filter may be used in conjunction with or replacement of amplifier 18. Amplifier 30 is connected to resistor 34, whereby a strengthened electrical signal is transmitted from amplifier 30 to resistor 34. Resistor 34 is connected to resistor 38 and negative terminal 46 of operational amplifier 40. A second terminal of resistor 38 is grounded.

The output of load cell 12 is connected to amplifier 28, whereby an electrical signal is transmitted from load cell 12 to amplifier 28. The output of amplifier 28 is connected to a first terminal of resistor 32, whereby an electrical signal is transmitted from the output of amplifier 28 to a first terminal of resistor 32. A second terminal of resistor 32 is connected to feedback resistor 36 and positive terminal 44 of operational amplifier 40. The output of operational amplifier 40 is connected to recording device 42, whereby an analog signal is transmitted to recording device 42.

Figure 4:
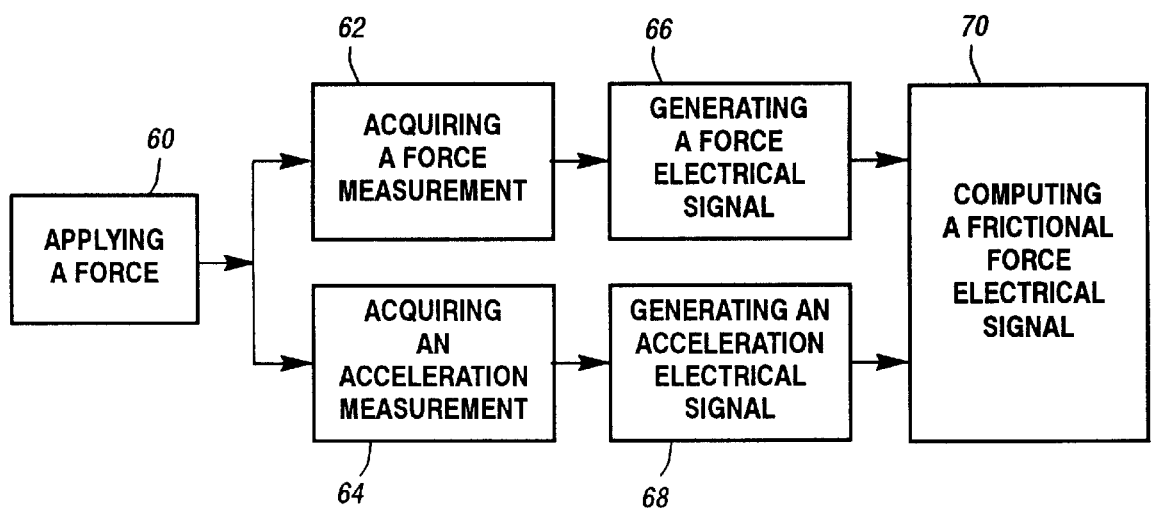
FIG 4. is a flow chart depicting the operational sequence for the preferred embodiment.

FIG. 4 is a flow chart depicting the operational sequence for the preferred embodiment. Block 60 indicates that a force is applied. The force is applied as either a push force or a pull force. Block 62 acquires the force measurement. Block 64 acquires the acceleration measurement. Block 62 and block 64 can acquire simultaneously a force measurement and an acceleration measurement, respectively. Block 66 generates a force electrical signal. Block 68 generates an acceleration electrical signal. Block 70 computes a friction electrical force.

What is claimed is:

1. Dynamic friction measurement device for determining a dynamic coefficient of friction, comprising:
   a first object having a sliding surface;
   a second object movably touching said sliding surface;
   an accelerometer adjustably mounted to said first object with its longitudinal axis of sensitivity aligned parallel to a direction of motion of said first object;
   a load cell adjustably mounted to said first object with its longitudinal axis of sensitivity aligned parallel to the direction of motion of said first object; and
   a computational device for determining a corrected frictional force based on measured electrical signals produced by said load cell and said accelerometer, said corrected frictional force representing the frictional force between said first and second objects without measurements error resulting from inertial forces caused by acceleration of said first object over said second object.

2. The dynamic friction measurement device of claim 1 wherein said first object is a weight.

3. The dynamic friction measurement device of claim 1 wherein said second object is stationary.

4. The dynamic friction measurement device of claim 1, wherein said computational device is connected in parallel to said load cell and said accelerometer for simultaneously receiving the signals from said load cell and said accelerometer.

5. The dynamic friction measurement device of claim 1, wherein said computational device comprises:
   a digital signal conditioning device, coupled for receipt of electrical signals from said accelerometer and said load cell, whereby said digital signal conditioning device produces digital electrical values; and
   a digital computer having at least one input coupled for receipt of signals from said digital conditioning signal device.

6. The dynamic friction measurement device of claim 5, wherein said digital signal conditioning device comprises:
   a first amplifier connected to said load cell, said load cell supplying said electrical signal to said first amplifier;
   a first A/D converter connected to said first amplifier to convert said electrical signal to a digital signal, said first amplifier supplying the electrical signal to said first A/D converter;
   a second amplifier connected to said accelerometer, said accelerometer supplying the electrical signal to said second amplifier; and
   a second A/D converter connected to said second amplifier, said second amplifier supplying the electrical signal to said second A/D converter.

7. The dynamic friction measurement device of claim 1, wherein said computational device comprises:
   an analog signal conditioning device for producing analog electrical values, said analog signal conditioning device receives electric signals from said accelerometer and said load cell;
   a storage device for receiving analog signals from said analog signal conditioning device, said storage manipulates said analog signals for storage and measurement; and
   an output device for displaying and computing with the analog signals.

8. The dynamic friction measuring device of claim 7, wherein said analog signal conditioning device comprises:
   a first amplifier, said load cell supplying said electrical signal to said first amplifier;
   a first resistor, one electrode of said first resistor is connected to said first amplifier, said first amplifier supplying the electrical signal to said first resistor;
   a second amplifier connected to said accelerometer, said accelerometer applying said electrical signal to second amplifier;
   a second resistor, one electrode of second resistor is connected to said second amplifier, said second amplifier supplying the electrical signal to said second resistor;
   an operational amplifier having a positive terminal, a negative terminal, an output, a feedback resistance connecting said output and said positive terminal, said positive terminal connected to said first resistor, said negative terminal connected to said second resistor; and
   a fourth resistor connected, one terminal of said forth terminal resistor and the other terminal of said forth resistor connected to the said negative terminal of said operational amplifier.

9. The dynamic friction measurement device of claim 8, wherein said analog signal conditioning device comprises a filter.

10. A method for determining a dynamic coefficient of friction between a first object and a second object, said first object and said second object having surfaces sliding relative to each other, comprising the step of:
    applying a force parallel to said sliding surface of said first object;
    acquiring a measurement of said applied force;
    acquiring a measurement of acceleration;
    generating an electrical signal $F_{lc}$ indicative of said measured force;
    computing a friction force electrical signal a indicative of measured acceleration; and
    computing a friction force electrical signal $F_f$ representing a frictional force without measurement error using said electrical signal $F_{lc}$ and acceleration electrical signal a, according to an equation:

$$F_f = F_{lc} - \frac{W}{g}a$$

where W represents the weight of said first object, and g is a gravitational acceleration.

11. The method of claim 10 whereby computing the friction force electrical signal $F_f$ results in an analog electrical signal.

12. The method of claim 10 whereby computing the friction force electrical signal $F_f$ results in a digital electrical signal.

* * * * *